United States Patent

[11] 3,588,434

| [72] | Inventor | Mikhail Pavlovich Dashkevich<br>prospekt Smirnova,45,kv.10, Leningrad, U.S.S.R. |
|---|---|---|
| [21] | Appl. No. | 657,947 |
| [22] | Filed | Aug. 2, 1967 |
| [45] | Patented | June 28, 1971 |

[54] SLIDING CURRENT LEADS TO MACHINES INTENDED FOR SEAM RESISTANCE WELDING
7 Claims, 1 Drawing Fig.

[52] U.S. Cl. ................................................. 219/84, 219/81
[51] Int. Cl. ...................................... B23k 11/06
[50] Field of Search .......................................... 219/84, 81; 339/5, 8

[56] References Cited
UNITED STATES PATENTS
| 2,407,676 | 9/1946 | Munson | 219/84 |
| 2,747,166 | 5/1956 | Hoffarth | 339/5 |

FOREIGN PATENTS
| 1,246,140 | 8/1967 | Germany | 219/84 |
| 654,305 | 10/1964 | Belgium | 219/84 |

*Primary Examiner*—J. V. Truhe
*Assistant Examiner*—Lawrence A. Rouse
*Attorney*—Waters, Roditi, Schwartz & Nissen ABSTRACT: A sliding current lead for machines for seam resistance welding comprises a nonrotatable sliding contact adapted for connection with a current-carrying bus bar and a working electrode fixed on a rotatable support shaft which is rotatable in bearings isolated from the body and said current-carrying bus bar. The nonrotatable sliding contact is arranged between the current-carrying bus bar and the working electrode and is applied against the latter by means of a current-carrying resilient member which electrically connects the nonrotatable sliding contact and the current-carrying bus bar and urges the sliding contact against the working electrode. A cooling liquid passes through the sliding current lead and applies additional contact force on the resilient member.

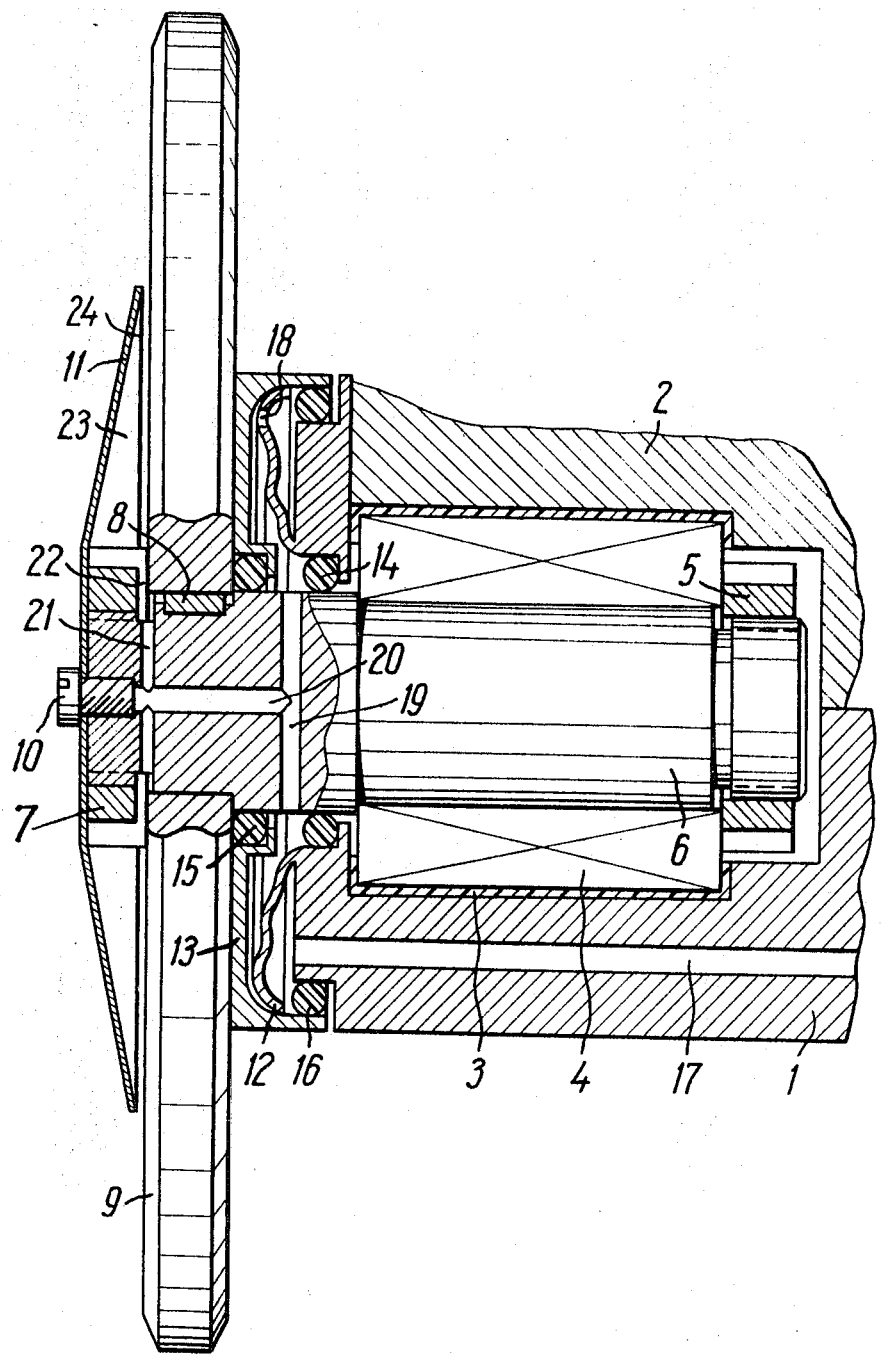

{ 3,588,434 }

SLIDING CURRENT LEADS TO MACHINES INTENDED FOR SEAM RESISTANCE WELDING

The present invention relates to sliding current leads of machines intended for seam resistance welding.

The existing sliding current leads of machines intended for seam resistance welding comprise a current-carrying bus bar; a working electrode, secured on a rotating supporting shaft, and a nonrotating sliding contact (brushes), supplying the welding current to the supporting shaft of the working electrode from the current-carrying bus bar.

A disadvantage of the existing sliding current leads is their high transition resistance between the sliding contact and rotating supporting shaft on account of a nonuniform distribution of the contact pressure on the working electrode during the operation of the welding machine.

Another disadvantage thereof is but a short service life of bearings of the supporting shaft because of their failure as caused by the electroerosive wear, resulting from the welding current passing through their component parts.

Besides, the existing sliding current leads require a great consumption of a cooling liquid.

An object of the present invention is to decrease the transition resistance in the welding current circuit.

Another object of the invention is to increase the reliability of the current lead in operation and to decrease the weight of the welding machine.

According to the present invention, these objects are accomplished due to the fact that a nonrotating sliding contact is disposed between the working electrode and current-carrying bus bar, and is pressed against the working electrode by a current-conducting member, connecting the nonrotating sliding contact to the current-carrying bus bar.

The current-conducting member may be designed as a diaphragm.

It is expedient to design the noncontacting sliding contact as a disc.

A favorable solution of the problem is also achieved due to the fact that the external surfaces of the working electrode, nonrotating sliding contact, current-carrying member, and the end of the current-leading bus bar are employed for realizing a thermal contact with the cooling fluid, setting up thereby an additional contact pressure between the working electrode and the sliding nonrotating contact.

In conformity with the present invention, in the sliding current lead for seam resistance welding machines the current flows from the current-carrying bus bar to the working electrode through the diaphragm and nonrotating sliding contact, bypassing thereby the rotating supporting shaft, mounted in bearings.

The present invention will be considered hereafter with reference to an exemplary embodiment thereof, taken in conjunction with the accompanying drawing, representing a cross-sectional view of the current lead for machines intended for seam resistance welding.

The sliding current lead comprises a current-carrying bus bar 1 and a component member 2 of the welding machine, intended to transmit the clamping force to electrodes.

A bearing 4 is secured between the current-carrying bus bar 1 and the member 2 through an insulating packing 3. A supporting shaft 6 is fastened to the internal race of the bearing 4 by the aid of a nut 5. A working electrode 9 is rigidly secured at another end of the supporting shaft 6 by the aid of a nut 7 and cotter 8; a cover 11 is fastened by means of a bolt 10 to said working electrode. The edge of a hole of a current-conducting member 12 is welded to the current-carrying bus bar, said current-conducting member resting with its external conical edge on the internal conical part of the nonrotating sliding contact 13 made as a disc, and presses it against the working electrode 9.

The current-conducting member 12 is essentially an elastic diaphragm.

Packing rings 14, 15 are provided between the current-leading bus bar 1, supporting shaft 6 and nonrotating sliding contact 13, said packing rings preventing the cooling fluid from entering the bearing 4 and the leakage of lubricant therefrom, as well as the penetration of said fluid into a gap between the sliding contact 13 and the supporting shaft 6.

A packing ring 16 is provided between the nonrotating sliding contact 13 and current-carrying bus bar 1, said packing ring preventing the leakage of the cooling fluid.

The cooling fluid flows through a channel 17 provided in the current-leading bus bar 1, washing thereby its end and the surface of the current-conducting member 12 facing it.

The cooling fluid passes further through a hole 18 provided in the current-conducting member 12, and washes the surfaces of the current-conducting member 12 and the nonrotating sliding contact 13 facing each other.

Then the cooling fluid flows through channels 19, 20 and 21 provided in the supporting shaft 6, and grooves 22 provided in the nut 7, into a cavity 23, washing the surface of the working electrode 9.

The cooling fluid is drained from the cavity 23 through a slot 24 provided between the working electrode 9 and cover 11.

When performing the seam welding, the welding current is supplied to the working electrode 9 from the current-leading bus bar 1 via the current-conducting member 12 and nonrotating sliding contact 13.

The described embodiment of the sliding current lead is adapted to decrease the transition resistance between the nonrotating sliding contact and the working electrode, to eliminate the failure of bearings of the supporting shaft as caused by their electroerosive wear, said bearings being insulated from the current-carrying bus bar, and to increase the reliability of the current lead during the operation thereof.

I claim:

1. A sliding current lead for machines for seam resistance welding, said lead comprising a current-carrying bus bar, a rotatable shaft, a working electrode secured to said shaft, an annular nonrotating sliding contact surrounding said shaft and between said working electrode and said current-carrying bus bar, and a current-conducting member electrically connecting said bus bar and said sliding contact, said current-conducting member including an elastic diaphragm portion having an annular surface of substantial annular area resiliently engaging a substantial annular area of said annular sliding contact to make electrical contact therewith and resiliently urge the sliding contact against said working electrode.

2. A lead as claimed in claim 1, wherein said elastic diaphragm portion has an inner end secured with said current-conducting member and an outer peripheral end with said annular surface.

3. A lead as claimed in claim 1, wherein said sliding contact is a disc.

4. A lead as claimed in claim 3, wherein said disc encircles said shaft.

5. A lead as claimed in claim 1 comprising means defining a fluid passageway extending through said bus bar and said diaphragm for the passage of a cooling fluid, said elastic diaphragm portion being positioned with respect to said passageway to be urged against the said sliding contact by the pressure of the fluid and supplement the force with which the sliding contact is urged against said working electrode.

6. A lead as claimed in claim 1, wherein the annular surface of the elastic diaphragm portion is curved and the sliding contact has a conforming curved annular surface against which said annular surface of the elastic diaphragm portion is in contact.

7. A sliding current lead for machines for seam resistance welding, said lead comprising a current-carrying bus bar, a rotatable shaft, a working electrode secured to said shaft, an annular nonrotating sliding contact between said working electrode and said current-carrying bus bar, a current-conducting member electrically connecting said bus bar and said sliding contact, said current-conducting member including an elastic diaphragm portion having an annular surface resiliently engaging said sliding contact to make electrical contact therewith and resiliently urge the sliding contact against said working electrode, and means defining a fluid passageway extending through said bus bar and said diaphragm for the passage of a cooling fluid, said elastic diaphragm portion being positioned with respect to said passageway to be urged against the said sliding contact by the pressure of the fluid and supplement the force with which the sliding contact is urged against said working electrode.